United States Patent [19]

Pinard et al.

[11] Patent Number: 5,586,169
[45] Date of Patent: Dec. 17, 1996

[54] METHOD OF RINGING A CALL RESPONSIVE APPARATUS WHICH ANSWERED AN IMMEDIATELY PRECEDING INCOMING CALL

[75] Inventors: Deborah L. Pinard; Graham Wilson, both of Kanata, Canada

[73] Assignee: Mitel Corporation, Kanata, Canada

[21] Appl. No.: 520,590

[22] Filed: Aug. 30, 1995

[30] Foreign Application Priority Data

Sep. 21, 1994 [CA] Canada ................................. 2132610

[51] Int. Cl.$^6$ .................................................. H04M 3/46
[52] U.S. Cl. .............................. 379/59; 379/201; 379/211; 379/233; 379/265
[58] Field of Search .................................. 379/58, 59, 60, 379/61, 62, 63, 112, 133, 201, 211, 220, 221, 225, 230, 265, 266, 210, 233

[56] References Cited

U.S. PATENT DOCUMENTS

| | | | |
|---|---|---|---|
| 4,674,115 | 6/1987 | Kaleita et al. | 379/201 |
| 4,964,155 | 10/1990 | Pinard | 379/266 |
| 5,062,103 | 10/1991 | Davidson et al. | 379/112 |
| 5,206,901 | 4/1993 | Harlow et al. | 379/211 |
| 5,259,017 | 11/1993 | Langmantel | 379/210 |
| 5,329,578 | 7/1994 | Brennan et al. | 379/201 |
| 5,353,331 | 10/1994 | Emery et al. | 379/58 |
| 5,384,831 | 1/1995 | Creswell et al. | 379/201 |
| 5,428,663 | 6/1995 | Grimes et al. | 379/58 |

FOREIGN PATENT DOCUMENTS

| | | | |
|---|---|---|---|
| 2082421 | 3/1982 | United Kingdom | H04M 3/42 |
| 2274758 | 8/1994 | United Kingdom | H04M 3/42 |
| 2282938 | 4/1995 | United Kingdom | H04M 3/42 |

*Primary Examiner*—Krista M. Zele
*Assistant Examiner*—Scott Wolinsky
*Attorney, Agent, or Firm*—Pascal & Associates

[57] ABSTRACT

A method of connecting an incoming call to one of a plurality of call responsive apparatus all of which are associated with a single directory number, comprised of determining which one of the call responsive apparatus answered an immediately preceding call, and ringing the one call responsive apparatus as a signal to respond to the incoming call.

8 Claims, 4 Drawing Sheets

DIRECTORY NUMBER SERVICE ASSIGNMENT TABLE I

| DIR # | EQUIP # | ASSOCIATED EQUIP # | ASSOCIATED EQUIP DELAY TIME (SEC) | ASSOCIATED EQUIP CANCEL TIME (MIN) | LAST DEVICE THAT ANSWERED |
|---|---|---|---|---|---|
| 5110101 | 1,1,1,1 | 1,2,2,1 | 10 | 20 | 1,2,2,1 |
| 5110102 | 1,1,1,2 | 1,2,2,2 | | | |
| 5110103 | 1,2,2,1 | - | | | |
| 5110104 | 2,3,4,1 | - | | | |
| 5110105 | - | 1,1,1,3 | 20 | | |
| 5110106 | 1,1,1,4 | - | | | |
| 5110107 | 1,1,1,5 | - | | | |

TABLE 1
DIRECTORY NUMBER SERVICE ASSIGNMENT

| DIR # | EQUIP # | ASSOCIATED EQUIP # | ASSOCIATED EQUIP DELAY TIME (SEC) | ASSOCIATED EQUIP CANCEL TIME (MIN) | LAST DEVICE THAT ANSWERED |
|---|---|---|---|---|---|
| 5110101 | 1,1,1,1 | 1,2,2,1 | 10 | 20 | 1,2,2,1 |
| 5110102 | 1,1,1,2 | 1,2,2,2 | | | |
| 5110103 | 1,2,2,1 | - | | | |
| 5110104 | 2,3,4,1 | - | | | |
| 5110105 | - | 1,1,1,3 | 20 | | |
| 5110106 | 1,1,1,4 | - | | | |
| 5110107 | 1,1,1,5 | - | | | |

FIG. 2

METHOD OF RINGING A CALL RESPONSIVE APPARATUS WHICH ANSWERED AN IMMEDIATELY PRECEDING INCOMING CALL

FIELD OF THE INVENTION

This invention relates to the field of telephony, and in particular to a method of ringing devices such as telephones wherein plural devices are associated with a single directory number.

BACKGROUND TO THE INVENTION

A telephone switching system can provide a facility in which plural devices such as telephone sets or other station apparatus (referred to herein collectively as devices), can be rung using a single telephone number. For example, it is common to have a group of devices in a ring group, all of which are rung when a switching machine is put into night service. As another example, a subscriber could have devices such as a cellular wireless telephone and a telephone wired to a switching office both rung using the same subscriber number. A subscriber could call the switching office and enter a code which instructs the switching office to route all calls to his directory number, to a particularly identified subscriber's line.

In all the cases noted above, a telephone switching machine must route incoming calls to the subscriber's directory number, to a particularly designated subscriber's line or to a group of such lines, either ringing all or ringing them in a set order. This has been found to be inefficient, because ringing all devices needlessly wastes ringing current and can disturb others within hearing range of the ringing devices. If the devices are rung in sequence, they can delay pickup of the call, because the subscriber to whom the call is directed could be located at the last device in the sequence, and would not know the call is to be picked up until the ringing reaches that last device.

SUMMARY OF THE INVENTION

In accordance with the present invention, when a group of devices, each of which is associated with a single directory number, has been rung in response to an incoming call to that directory number, and the call is answered on one of the devices, a subsequent call to that same directory number causes ringing first to the device which has been used to answer the previous call. As a result only one device is initially rung, avoiding disturbance of other persons within hearing range of the other devices of the group. In addition, since that one device is initially rung first, there is no delay in ringing the device which is most likely to be answered.

The system in effect learns where the called subscriber is located and routes subsequent calls to the device at the location of the called subscriber.

It is preferred that in the event the called subscriber does not answer the call within a predetermined period of time, each of the devices in the group in order is rung. Whichever device is answered becomes the device to which subsequent calls are initially rung.

It is also preferred that after a predetermined time-out period, record of the last device which answered a call is deleted, and all devices in the group are rung in response to an incoming call. Alternatively all subsequent calls can be routed for ringing to a particularly designated device, or all devices in the group could be rung in a predetermined order.

In accordance with an embodiment of the present invention, a method of connecting an incoming call to one of a plurality of call responsive apparatus all of which are associated with a single directory number, is comprised of determining which one of the call responsive apparatus answered an immediately preceding call, and ringing the one call responsive apparatus as a signal to respond to the incoming call.

In accordance with a second embodiment, the first embodiment includes connecting the incoming call to the one call responsive apparatus in the event the one call responsive apparatus answers the ringing within a predetermined first delay time.

In accordance with a third embodiment, the second embodiment includes ringing another of the plurality of call responsive apparatus in the event the one call responsive apparatus does not answer the ringing within the first delay time, and connecting the call to another of the call responsive apparatus in the event the another of the call responsive apparatus answers the ringing within a delay time equal to the first delay time.

In accordance with another embodiment of the present invention, in the first embodiment plural ones of the plurality of call responsive apparatus are communication circuits associated with cells of a wireless communication system, the ringing step being comprised of sending a ringing control signal to one of the communication circuits associated with the cell within which a wireless call responsive apparatus has answered an immediately preceding call, for ringing the wireless call responsive apparatus within the latter cell.

In accordance with another embodiment, a method of connecting an incoming call to one of a plurality of call responsive apparatus all of which are associated with a single directory number is comprised of establishing a table associated with the directory number, listing in a first field of the table a primary equipment number and in at least a second field an equipment number of at least a second associated call responsive apparatus, storing in a third field of the table a record of an associated equipment delay time, storing in a last device field of the table a record of an equipment number of a call responsive apparatus which answered an immediately preceding incoming call, reading the last device record and ringing the call responsive apparatus which answered the immediately preceding call as a signal to answer the call.

BRIEF INTRODUCTION TO THE DRAWINGS

A better understanding of the invention will be obtained by reading the description of the invention below, with reference to the following drawings, in which.

DETAILED DESCRIPTION OF THE INVENTION

Figure 1A:
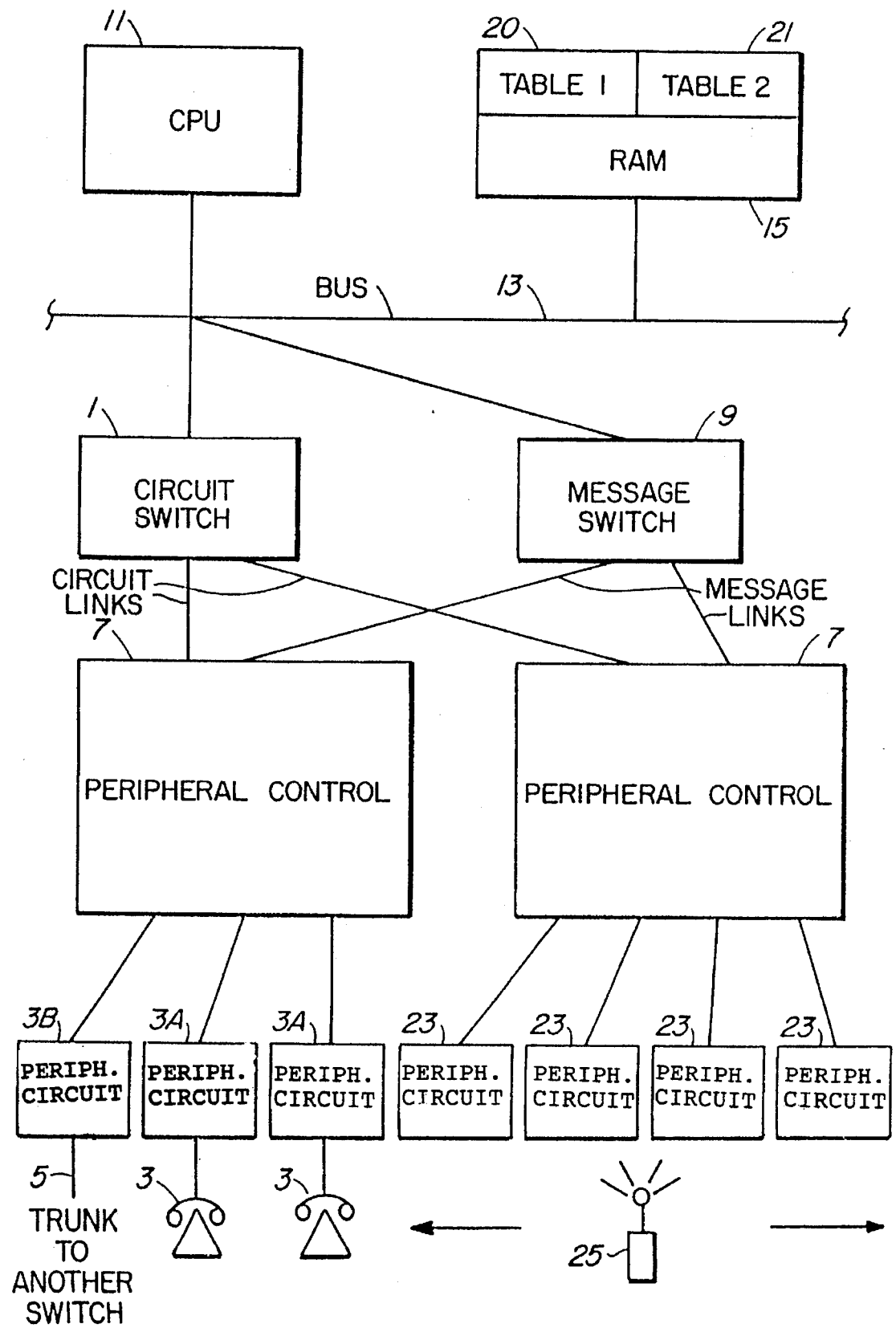
FIG. 1A is a block diagram illustrating a prior art switching system.

FIG. 1A illustrates a typical PABX telephone system in accordance with the prior art, such the one sold by Mitel Corporation as type SX-2000, and as described in U.S. Pat.

No. 4,615,028 issued Sep. 30, 1986 and U.S. Pat. No. 4,616,360 issued Oct. 7, 1986 and assigned to Mitel Corporation. Basically this system is comprised of a circuit switch 1 for switching calls between telephones 3 and trunks 5 which terminate at line and trunk circuits (not shown) and are routed to the circuit switch via peripheral circuits 3A and 3B and a peripheral switch in peripheral control 7. Control message signals are switched to the peripheral switch via a message switch 9. Messages are received by the message switch, and the circuit switch is controlled by, a central processing unit (CPU) 11, which sends signals to the message and circuit switches via bus 13. Programs for operating the CPU, and data stored during its operation are stored in random access memory (RAM) 15.

In the SX-2000 system, there is the facility of routing all incoming calls to the PABX to ring a particular single number or group of numbers during night hours, i.e. and automatic night line facility. This requires that a PABX attendant, operating an attendant station connected to the bus 13, sets up the night line facility when the PABX is first installed and programmed. This causes an incoming call to ring a particular telephone connected to the PABX to ring all telephones in a ring group.

Clearly the above system (as does other systems) routes all incoming calls to fixedly designated lines, and cannot route incoming calls to a particular subscriber directory number, which directory number is associated with a group of devices, to one of the devices where the subscriber is most likely to be located. Indeed, call transfer can only be set up by an attendant station, which is not reasonably usable to obtain the objectives of the present invention.

Figure 1B:
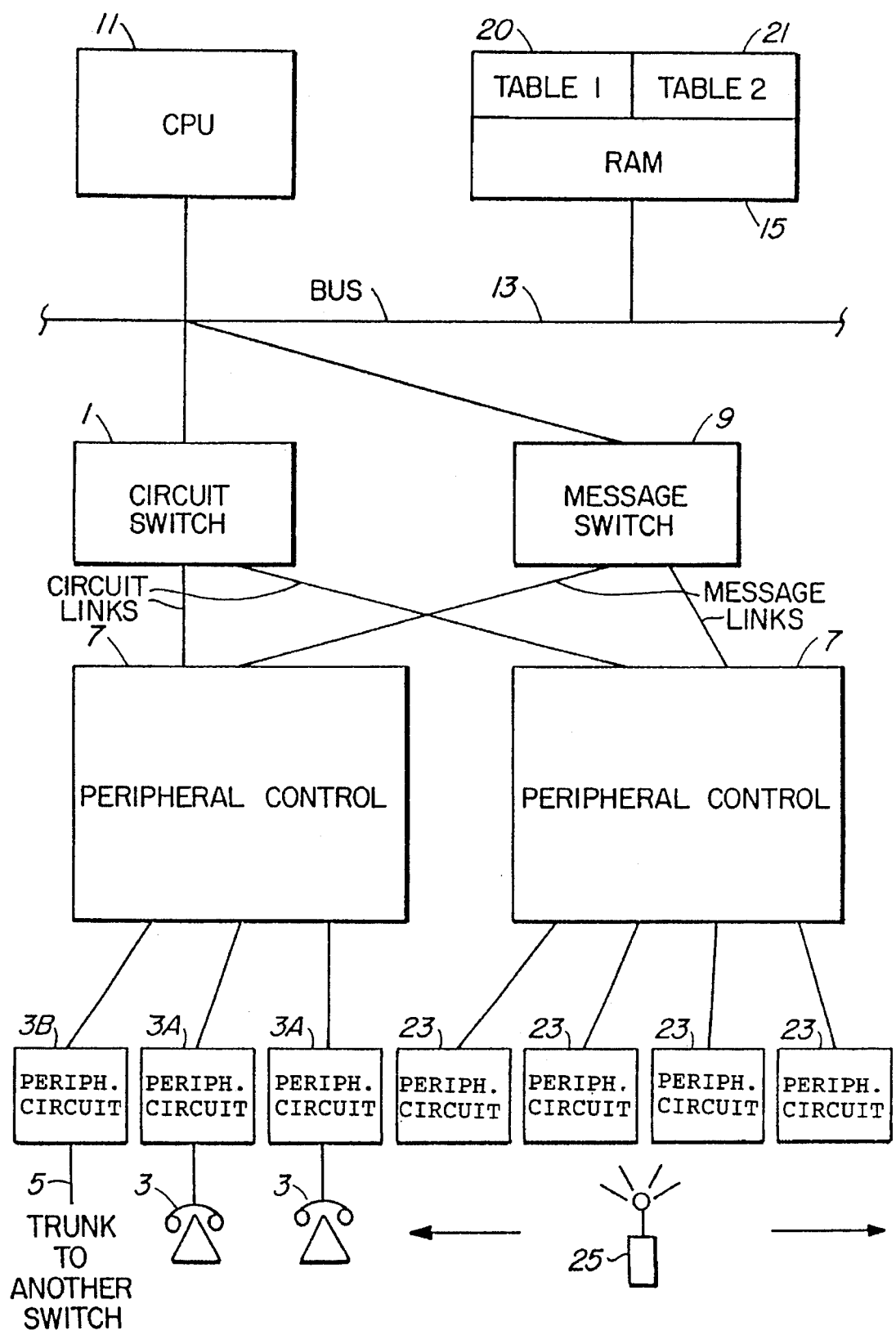
FIG. 1B is a block diagram of a modified switching system of FIG. 1A, for carrying out applicant's invention, FIG. 2 contains Table 1 which is contained in a random access memory of the system of FIG. 1B.

To implement the present invention the system described above can modified by establishing a pair of tables, Table 1 being designated by reference numeral 20 and Table 2, being designated by reference numeral 21, in one or plural random access memories (RAMs), or physically combined e.g. within RAM 15, as shown in FIG. 1B. The operation program to implement the process embodiments of the invention described herein is also stored in RAM 15, or in another RAM connected to bus 13, for ready access by the CPU 11.

Systems other than type SX-2000 described herein can be modified in a similar manner, using the principles described herein; the invention is not limited to use of the SX-2000 system.

The system can include wireless communication, wherein peripheral circuits 23 include means to communicate with a wireless communication device 25 such as a personal digital assistant (PDA), personal communication device, cellular telephone, etc., of the type for example described in U.S. Pat. No. 4,866,732 issued Sep. 12, 1978 and U.S. patent application 07/996,673 filed Dec. 24, 1992. In such a case, different peripheral circuits 23 are used to communicate with the device 25 as it roams from cell to cell. Previously, in order to ring device 25, each of circuits 23 would be considered as being associated with device 25 and would receive a ringing signal, since the system would not know in which cell device 25 is located. In accordance with the present invention, only one of the circuits 23 is associated with a cell where the device 25 answered the immediately preceding call, and the subsequent call is routed to that cell, identified by the circuit 23 (i.e. device) identification.

Table 1 contains a column listing directory numbers of various lines and devices which can be reached by the switching system. For example in the first column, labeled Dir#, directory numbers 5110101, 5110102, etc. are listed.

The second column, labeled Equip, contains a list of the equipment number associated with the directory number. For example, one of the telephone sets (or subscriber lines) 3 can have equipment number 1,1,1,1 and be associated with directory number 5110101.

In accordance with the present invention, at least one associated equipment number, which is associated with the directory number is listed. Where only a single additional device is associated with the originally designated device, it can be listed in a single third column, shown headed by the heading Associated Equip#. As shown in the figure, the equipment number 1,2,2,1 is associated with directory number 5110101. If more devices are associated, they can be listed in additional Associated Equipment# columns within the table. Each of the devices associated with a single directory number is referred to as a group of devices.

A fourth column shown headed Associated Equip Delay Time (sec) contains a delay time, if entered, for use by a timer as will be described below. This delay time represents the time, in seconds, that the system should wait before ringing the a second or subsequent device. Preferably a fifth column shown headed Associated Equip Cancel time (min) contains a delay time, if entered, for use by another timer as will be described below. A sixth column, contains reference to the device number of the last device of the group which has answered a call, or is blank, as will be described below.

Figure 3:
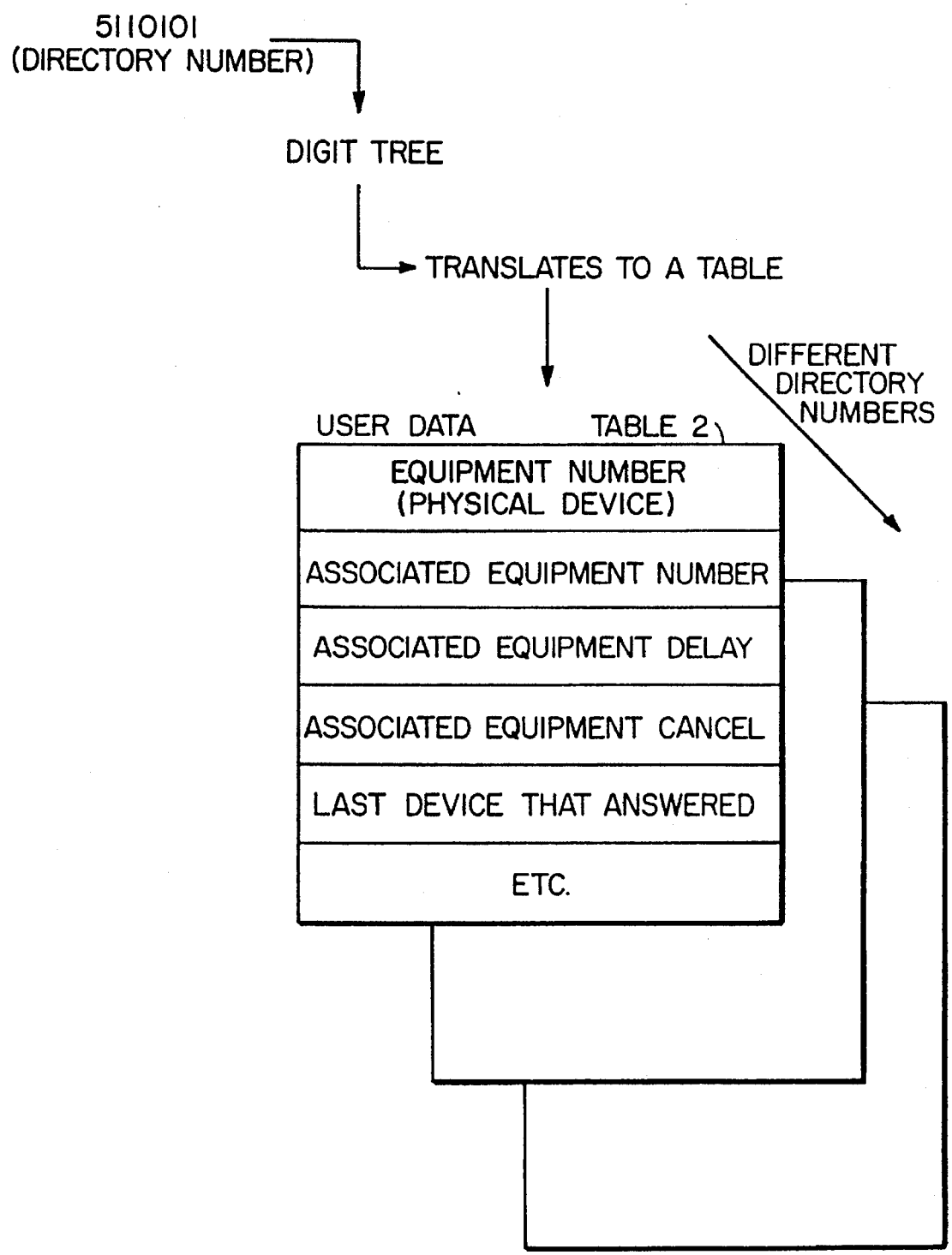
FIG. 3 is a flow chart illustrating operation of the present invention, and containing Table 2.

Operation of the invention will now be described with reference to the flow chart shown in FIG. 3. Assume that an incoming call is received by the system to directory number 5110101. The system consults a digit tree to identify the device identification number to which the call is to be directed (i.e. which device is to be rung), in a well known manner. In the present case, however, the digit tree is translated to a Table 2, which is Table 1 transposed into vertical form rather than in horizontal form as shown in FIG. 2. The particular Table 2 to use is identified by the directory number.

The Last Device That Answered field is consulted by the CPU. If it is blank, all devices listed in the Equipment Number and Associated Equipment Number fields are rung.

When one of the devices is answered, the CPU stores the equipment number of the answering device in the Last Device That Answered field. The equipment number identity of the device which answers the call is stored in the Last Device That Answered field of Table 2, preferably for a time period specified in the Associated Equipment Cancel Time field of Table 2.

When a subsequent call to the directory number is received, as noted earlier the directory number is decoded in a digit tree, and the Table 2 records related to the directory number is identified. The Last Device That Answered field is consulted, and the equipment number of the device of the group which last answered the call is identified. That device is then rung. It then consults the Associated Equipment Delay Time field and sets a timer with that time. If the call is not answered within the time before the timer times out, the other device or another device in sequence, identified in the table as being in the same group, is rung.

It is preferred, but is optional, that when the call is answered or ends, a second timer is set with the time stored in the Associated Equipment Cancel Time field of Table 2. After the latter timer times out, the Last Device That Answered field should be erased. If a subsequent call is received to the same directory number, then all devices of the group are rung, as described earlier.

In the case of a call to a wireless device such as device 25, the device equipment number of a peripheral wireless line circuit 23 which is associated with the cell in which the device 25 has answered the immediately previous call is stored in the Last Device That Answered field. Subsequent calls are thus routed for ringing directly to that circuit 23, thus reducing the traffic through the remaining circuits 23 and associated channels, and allowing more calls to be handled by the wireless system.

A person understanding this invention may now conceive of alternative structures and embodiments or variations of the above. All of those which fall within the scope of the claims appended hereto are considered to be part of the present invention.

We claim:

1. A method of connecting an incoming call to one of a plurality of call responsive apparatus all of which are associated with a single directory number, comprising establishing a table associated with the directory number, storing in a last device field of the table a record of an equipment number of one of said plurality of call responsive apparatus which answered an immediately preceding incoming call, reading said record, ringing said one call responsive apparatus as a signal to respond to the incoming call, and connecting the incoming call to said one call responsive apparatus in the event said one call responsive apparatus answers said ringing within a predetermined first delay time.

2. A method as defined in claim 1 in which plural ones of the plurality of call responsive apparatus are communication circuits associated with cells of a wireless communication system, said ringing step being comprised of sending a ringing control signal to one of the communication circuits associated with the cell within which a wireless call responsive apparatus has answered an immediately preceding call, for ringing the wireless call responsive apparatus within the cell within which a wireless call responsive apparatus has answered an immediately preceding call.

3. A method as defined in claim 1 including ringing another of said plurality of call responsive apparatus in the event said one call responsive apparatus does not answer said ringing within said first delay time, and connecting the incoming call to another of said call responsive apparatus in the event said another of said call responsive apparatus answers said ringing within a delay time equal to the first delay time.

4. A method as defined in claim 3 including ringing all of said plurality of call responsive apparatus as a signal to respond to the incoming call instead of ringing said one call responsive apparatus in the event a second delay time much longer than the first delay time has passed after a device has answered a previous call, and connecting the incoming call to a call responsive apparatus of said plurality of call responsive apparatus which answers the ringing.

5. A method as defined in claim 4 in which plural ones of the plurality of call responsive apparatus are communication circuits associated with cells of a wireless communication system, said ringing step being comprised of sending a ringing control signal to one of the communication circuits associated with the cell within which a wireless call responsive apparatus has answered an immediately preceding call, for first ringing the wireless call responsive apparatus within the cell within which a wireless call responsive apparatus has answered an immediately preceding call, then ringing one or all of the communication circuits associated with all of the cells of the wireless communication system in the event either one of the first or second delay time has expired.

6. A method of connecting an incoming call to one of a plurality of call responsive apparatus all of which are associated with a single directory number, comprising establishing a table associated with the directory number, listing in a first field of the table a primary equipment number of a first call responsive apparatus associated with said single directory number and listing in at least a second field of the table an equipment number of at least a second associated call responsive apparatus, storing in a third field of the table a record of an associated equipment delay time, storing in a last device field of the table a record of an equipment number of a call responsive apparatus which answered an immediately preceding incoming call, reading said last device record, ringing the call responsive apparatus associated with the equipment number stored in said last device record as a signal to answer the call, and connecting the incoming call to said rung call responsive apparatus in the event the call is answered by said rung call responsive apparatus within a predetermined time interval.

7. A method as defined in claim 6 including reading the record in the third field, setting a timer to the delay time stored in the record in the third field, accessing a substitute equipment number stored in one of the first and second fields in the event the timer times out and ringing a device identified by the substitute equipment number in place of the call responsive apparatus which answered the immediately preceding call as a signal to answer the call.

8. A method as defined in claim 7 including storing in a fourth field a record of an associated equipment cancel time which is much longer than the associated equipment delay time, reading the fourth field each time an incoming call has been answered and setting a cancel timer, blanking the last device field in the event the cancel timer has run out and ringing all of said plurality of call responsive apparatus associated with a single directory number to which an incoming call is directed in the event the last device field is blank.

* * * * *